United States Patent
Sorsa et al.

(10) Patent No.: US 6,563,305 B1
(45) Date of Patent: May 13, 2003

(54) ACTUATOR OF A PAPER OR BOARD MACHINE INCLUDING HALL ELEMENT POSITION SENSOR

(75) Inventors: Jukka Sorsa, Tampere (FI); Juha Sanaksenaho, Tampere (FI); Kimmo Saunisto, Jyskä (FI)

(73) Assignee: Metso Automation Oy, Tampere (FI)

( * ) Notice: Subject to any disclaimer, the term of this patent is extended or adjusted under 35 U.S.C. 154(b) by 0 days.

(21) Appl. No.: 09/233,544

(22) Filed: Jan. 20, 1999

(30) Foreign Application Priority Data

Jan. 23, 1998  (FI) .................................. 980153

(51) Int. Cl.[7] .................. G01B 7/30; G01B 7/14; G01D 5/12; F16K 37/00
(52) U.S. Cl. ................. 324/207.2; 324/207.24; 324/207.25; 137/554
(58) Field of Search ............... 324/207.2, 207.22, 324/207.23–207.25; 340/686; 338/32 H; 137/554

(56) References Cited

U.S. PATENT DOCUMENTS

| | | | | |
|---|---|---|---|---|
| 3,317,829 A | * | 5/1967 | Kuhrt et al. | 324/69 |
| 3,342,070 A | * | 9/1967 | Walch | |
| 3,981,767 A | * | 9/1976 | Al-Shaikh | |
| 4,240,020 A | * | 12/1980 | Okuyama et al. | 318/721 |
| 4,319,188 A | * | 3/1982 | Ito et al. | 324/173 |
| 4,662,398 A | | 5/1987 | Wywailowski et al. | 137/625.4 |
| 4,719,419 A | * | 1/1988 | Dawley | 324/208 |
| 4,884,649 A | * | 12/1989 | Onishi et al. | 180/179 |
| 5,004,981 A | * | 4/1991 | Hashimoto et al. | 324/207.22 |
| 5,159,268 A | * | 10/1992 | Wu | 324/207.2 |
| 5,634,373 A | * | 10/1992 | Cuffe et al. | 74/89.15 |
| 5,228,792 A | | 7/1993 | Crevecoeur et al. | 400/630 |
| 5,602,472 A | * | 2/1997 | Bergstedt et al. | 324/207.25 |

FOREIGN PATENT DOCUMENTS

| | | |
|---|---|---|
| DE | 3138323 | 4/1983 |
| DE | 3726885 | 2/1989 |
| DE | 3903359 | 8/1990 |
| DE | 19506938 | 8/1996 |
| DE | 29701674 | 5/1997 |
| EP | 0443514 | 8/1991 |
| FI | 85731 | 2/1992 |
| GB | 2039079 | 7/1980 |
| GB | 2225415 | 5/1990 |
| WO | 9520781 | 8/1995 |

OTHER PUBLICATIONS

Derwent Abstract of DE 29701674 dated May 28, 1997.

* cited by examiner

Primary Examiner—Gerard R. Strecker
(74) Attorney, Agent, or Firm—Ladas & Parry

(57) ABSTRACT

The invention relates to an actuator comprising a motor (4) by which the shafts (1, 5, 7) of the actuator are driven. At least one magnet (20 is arranged in conjunction with the shaft (1, 5, 7). The actuator further comprises at least one Hall sensor (3), which generates pulses as the magnet (2) on the shaft (1, 5, 7) passes the Hall sensor (3) as the shaft (1, 5, 7) rotates. The pulses are used to define the position of the actuator in the linear direction.

4 Claims, 1 Drawing Sheet

ACTUATOR OF A PAPER OR BOARD MACHINE INCLUDING HALL ELEMENT POSITION SENSOR

BACKGROUND OF THE INVENTION

The invention relates to an actuator of a paper or board machine comprising a motor; a shaft driven by the motor, the position of the actuator in the linear direction being adjusted by rotating the shaft by the motor; and a sensor arranged to measure the rotation of the shaft and to generate a pulse output proportional to the rotation of the shaft to define the position of the actuator in the linear direction.

Actuators are used, for example, to control the flow of different media, such as water and steam, in different processes. The actuators control a valve, nozzle or the like supplying the medium. The actuator can be a motor, cylinder or the like, which can be controlled in many different ways, for example mechanically, electrically, hydraulically or pneumatically.

U.S. Pat. No. 4,662,398 discloses a valve controlling the flow of steam and air to the steam box of an apparatus for drying a fiber web. The valve is controlled by a stepping motor. The control arrangement of the stepping motor is very complicated, and it is uncertain whether the motor will operate reliably in the very difficult process conditions of a paper machine. Further, the positioning data of the valve, defined solely on the basis of the control of the stepping motor, is rather unreliable.

DE Utility Model 29 701 674 discloses an actuator comprising a valve that is controlled by a brushless electrical motor. The position of the rotor of the brushless motor is measured by means of Hall sensors, and so the position of the actuator is also defined on the basis of the pulses generated by the Hall sensor. The publication teaches that the Hall sensor is also particularly used to effect the rotating motion of the motor. The control system of the brushless motor is complicated, and the rotation of the rotor is also difficult and complicated to measure. It is thus out of the question to use the sensor defining the position of the rotor and the brushless motor in the processing conditions of a paper machine.

FI Patent 85 731 discloses actuators whose spindles are adjusted by stepping motors. The position of the spindles is measured by LVDT sensors. The control arrangement of the stepping motor is complicated and cumbersome. The LVDT sensor endures the process conditions of a paper machine rather poorly, and it is susceptible to malfunction. The signal generated by the LVDT sensor is also very weak, and for example due to great temperature dependence, the accuracy of the sensor is rather poor.

GB Patent Application 2 225 415 discloses a fluid flow valve controlled by a stepping motor. The position of the valve can be measured by an optical shaft encoder. The optical encoder requires a complicated and sensitive electronic arrangement, which is difficult to arrange in conjunction with a paper machine: the optical encoders do not endure the process conditions of a paper machine.

SUMMARY OF THE INVENTION

The actuator of the invention is characterized in that at least one detection point is arranged in conjunction with the shaft, and that the apparatus comprises at least one Hall sensor, which generates a pulse when the detection point of the shaft revolves past the Hall sensor.

The essential idea of the invention is that a detection point is arranged in conjunction with the shaft of the actuator, and that a Hall sensor is arranged in the apparatus, the Hall sensor outputting a pulse when the shaft rotates and the detection point passes the Hall sensor. When the shaft of the actuator rotates, the position of the actuator can be defined on the basis of the pulses generated by the Hall sensor. In a preferred embodiment, the detection point arranged in conjunction with the shaft is provided by a magnet, the motion of which is detected by the Hall sensor when the shaft rotates. In a second preferred embodiment, the measurement is taken at the shaft of the motor of the actuator. In a third preferred embodiment, the motor of the actuator is a synchronous motor.

The advantage of the invention is that the position of the actuator can be measured in an accurate and simple way using an apparatus that endures even hard process conditions. When magnets are arranged on the shaft, the signal generated by the Hall sensor is very reliable. When the measurement is taken at the shaft of the motor, great measurement accuracy is achieved. The use of a synchronous motor makes the actuator simple and reliable, and easy to control.

BRIEF DESCRIPTION OF THE DRAWINGS

The invention is described in greater detail in the attached drawings, in which.

DESCRIPTION OF INVENTION SHOWN IN DRAWINGS

Figure 1:
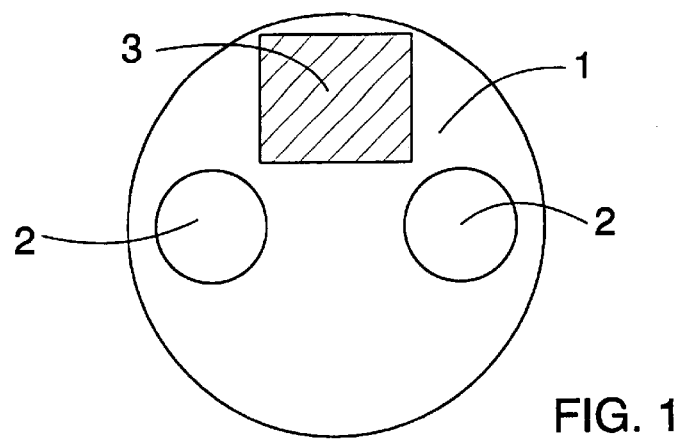
FIG. 1 is a general schematic cross-sectional view of a principle of a measurement arrangement according to the invention at the shaft of the actuator, seen from the end of the shaft.

FIG. 1 shows a shaft 1 of the actuator. The shaft 1 of the actuator can be either the control shaft of the actuator or the shaft of the motor. Magnets 2 are arranged (i.e., circumferentially discontinuous) on (i.e., not about) the shaft 1. The apparatus further comprises a Hall sensor 3, which is arranged at the front of the end of the shaft 1. When the motor of the actuator is driven, the shaft 1 rotates, whereby the magnets 2 revolve past the Hall sensor 3. When the magnet 2 passes the Hall sensor 3, the Hall sensor 3 generates a pulse, the positioning of the actuator is proportional to the rotating motion of the shaft 1: the interval between the pulses corresponds to a certain change in the positioning of the actuator. The position of the actuator can thus be defined on the basis of the pulses.

Figure 2:
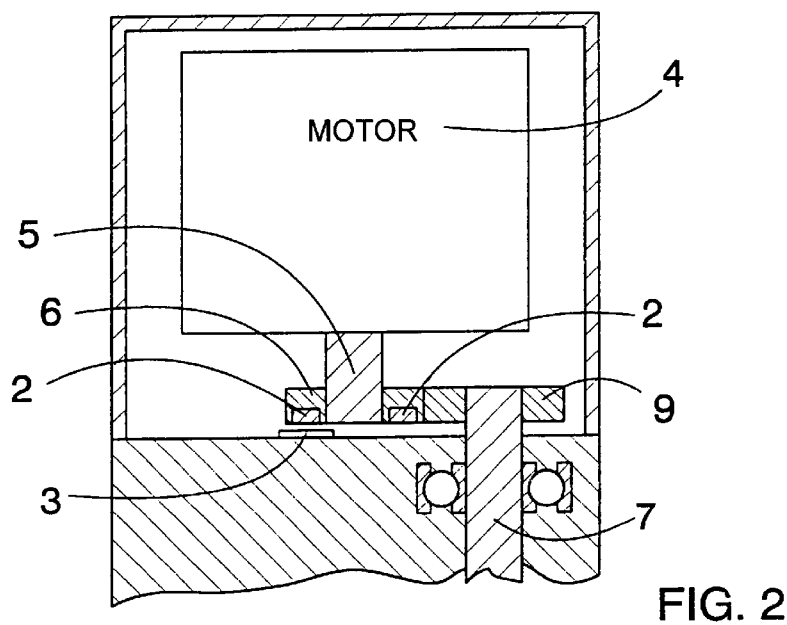
FIG. 2 is a schematic cross-sectional side view of an actuator according to the invention.

FIG. 2 shows an actuator in which the magnets 2 are arranged at a shaft 5 of a motor 4. The shaft 5 of the motor is provided with a cogwheel 6, in which the magnets 2 are arranged. Cooperative cogwheels 6,9 transmit the rotating motion of the shaft 5 of the motor, turning it into the rotating motion of a control shaft 7 of the actuator. The rotation of the control shaft 7 adjusts the position of the valve or another actuator in the linear direction, and the adjustment can be effected, for example, by cogwheels or gearing or other shafts. For the sake of clarity, the attached drawings do not show the valve nor the gearing nor the other shafts.

The actuator of the invention can be an actuator known per se, used, for example, in a steam box, head box or moisturizer or some other part of a paper or board machine. It is previously known to use controllable profiling equipment to improve the cross profile variables of the paper web, the equipment being usually divided into control sections crosswise of the web. Each valve, nozzle, etc. that is in the control section of the profiling equipment and affects the variables of paper is controlled by actuators arranged in the section. Any changes effected by the actuators and elements, for example a motion, force, flow, or the like, have an indirect effect on the cross profile characteristics of paper, which include basis weight, moisture, thickness and gloss. The motion, force or some other change mentioned above can be effected in the element by the actuators. The actuator of the invention is particularly useful in the control of the steam supply of the steam box of a paper machine. The amount of steam supplied from the steam box onto the surface of the web is currently adjusted by the pressure of the supplied steam. The pressure is difficult to adjust accurately, and the amount of steam flowing through individual steam nozzles cannot be defined. The pressure is defined by an analogue gauge, which is expensive. The solution of the invention is cheap and very accurate, since the precise position of the steam control shaft is known. The amount of steam is calculated on the basis of pulse data, whereby no separate gauges are needed. The amount of steam is adjusted quickly and accurately by means of the pulse data and the control shaft. The invention thus makes it possible to replace expensive gauges, and thereby save money.

The motor 4 is preferably a synchronous motor with a simple control arrangement. The actuator can thus be rendered simple and reliable.

Arranged in the manner shown in FIG. 2, the Hall sensor 3 and the magnets 2 and the entire actuator can be encased in a housing, whereby they resist wear and also endure well the processing conditions of a paper machine.

Figure 3:
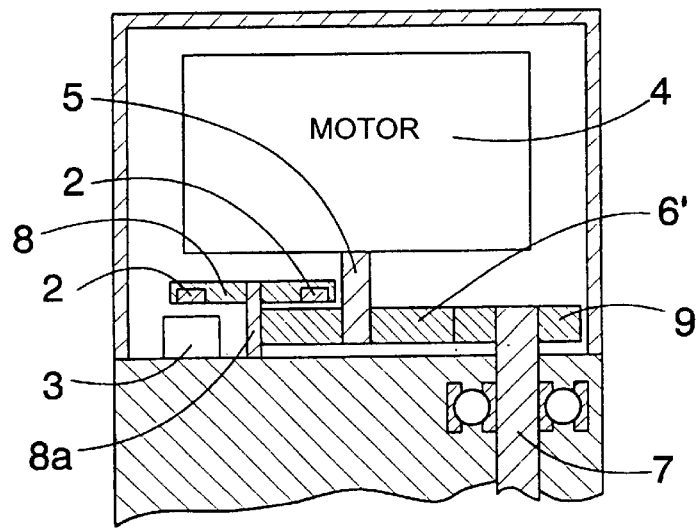
FIG. 3 is a schematic cross-sectional side view of another actuator according to the invention.

FIG. 3 shows a solution in which the cogwheel 6' of the shaft 5 is also arranged to rotate a detection point wheel 8. The magnets are arranged in the detection point wheel 8. The cogwheel 6' and a shaft 8a of the detection point wheel 8 have preferably toothed edges. The rim of the cogwheel 6' of the shaft 5 is larger than the rim of the shaft 8a of the detection point wheel 8, and so when shaft 5 rotates, the detection point wheel 8 rotates faster than shaft 5. If the ratio of the rim of the shaft 8a of the detection point wheel 8 to the rim of the cogwheel 6' is 1/20, one turn of shaft 5 corresponds to twenty turns of the detection point wheel 8. If, for example, five magnets are arranged in the detection point wheel 8, a hundred pulses are obtained by the Hall sensor 3 on one turn of shaft 5. Typically the motion corresponding to one pulse is 1 micrometer, i.e. the pulses are very frequent, whereby the position of the actuator can be defined very accurately on the basis of the pulses.

The drawing and the associated description are intended only to illustrate the idea of the invention. The invention can vary in its details within the scope of the claims. The number and positioning of the Hall sensors and magnets can thus vary according to the need. Further, a magnet need not necessarily be arranged in conjunction with the shaft, but the Hall sensor can also detect another kind of detection point in the shaft, such as a notch or protrusion or some other asymmetrical point in the shaft, and thereby generate a pulse as the detection point passes the sensor. Further, the detection point can consist of non-magnetic material: the Hall sensor detects the passing of such material if the rest of shaft is made of magnetic material.

What is claimed is:

1. In an actuator of a paper or board machine comprising a motor, and a shaft rotated by the motor for linearly adjusting a position, the improvements wherein:

one of at least one detection point and at least one Hall sensor are arranged for rotation in conjunction with the shaft, revolving relatively past the other thereof and generating a pulse when the detection point revolves relatively past the Hall sensor, a number of the pulses being proportional to the position; and a wheel for the detection point is arranged to be driven by the shaft, a rim of that part of the shaft which comes into contact with the wheel being larger than a rim of that part of the wheel which comes into contact with the shaft, so that when the shaft rotates, the wheel rotates faster than the shaft.

2. In an actuator of a paper or board machine comprising a motor, and a shaft rotated by the motor for linearly adjusting a position, the improvements wherein:

one of at least one detection point and at least one Hall sensor are arranged for rotation in conjunction with the shaft, revolving relatively past the other thereof and generating a pulse when the detection point revolves relatively past the Hall sensor, a number of the pulses being proportional to the position;

the detection point is in conjunction with the shaft and comprises a magnet; and a wheel for the detection point arranged to be driven by the shaft, a rim of that part of the shaft which comes into contact with the wheel being larger than a rim of that part of the wheel which comes into contact with the shaft, so that when the shaft rotates, the wheel rotates faster than the shaft.

3. An actuator as claimed in claim 1, wherein the motor is a synchronous motor.

4. An actuator as claimed in claim 2, wherein the motor is a synchronous motor.

* * * * *

UNITED STATES PATENT AND TRADEMARK OFFICE
CERTIFICATE OF CORRECTION

PATENT NO. : 6,563,305 B1
DATED : May 13, 2003
INVENTOR(S) : Jukka Sorsa et al.

It is certified that error appears in the above-identified patent and that said Letters Patent is hereby corrected as shown below:

<u>Title page,</u>
Item [73] "Tampere" should read -- Helsinki --.

Signed and Sealed this

Sixteenth Day of September, 2003

JAMES E. ROGAN
*Director of the United States Patent and Trademark Office*